United States Patent
Hogan

[11] Patent Number: 5,851,361
[45] Date of Patent: Dec. 22, 1998

[54] APPARATUS FOR PROCESSING AN ORGANIC SOLID

[76] Inventor: Jim S. Hogan, 1742 Country Club Dr., Sugar Land, Tex. 77478

[21] Appl. No.: 755,671

[22] Filed: Nov. 25, 1996

[51] Int. Cl.⁶ .................................................. C10B 1/10
[52] U.S. Cl. ........................ 202/136; 202/118; 202/128; 202/131; 202/133; 202/218; 201/12
[58] Field of Search .................................. 202/118, 128, 202/131, 133, 136, 218; 201/7, 12; 585/240, 241

[56] References Cited

U.S. PATENT DOCUMENTS

| | | |
|---|---|---|
| 514,546 | 2/1894 | Ekelund . |
| 1,446,857 | 2/1923 | Peiter . |
| 1,495,573 | 5/1924 | Cantieny . |
| 1,573,824 | 2/1926 | Griffiths . |
| 1,677,758 | 7/1928 | Frank . |
| 1,857,171 | 5/1932 | Vandergrift . |
| 1,881,826 | 10/1932 | McQuade . |
| 1,898,326 | 2/1933 | Wahlstrom . |
| 1,916,900 | 7/1933 | Vandergrift et al. . |
| 1,927,219 | 9/1933 | Reed et al. ............................... 202/218 |
| 1,927,244 | 9/1933 | Pier et al. . |
| 1,944,647 | 1/1934 | Petit ........................................ 202/131 |
| 1,980,828 | 11/1934 | Reed et al. ................................. 202/28 |
| 1,995,873 | 3/1935 | Vandergrift et al. ..................... 202/131 |
| 2,151,849 | 3/1939 | Hardy et al. ............................. 202/131 |
| 2,219,407 | 10/1940 | Baptist ..................................... 202/131 |
| 2,500,553 | 3/1950 | Lykken ...................................... 266/24 |
| 2,872,386 | 2/1959 | Aspegren ................................. 202/136 |
| 3,020,212 | 2/1962 | Lantz ........................................ 202/118 |
| 3,142,546 | 7/1964 | Coats ......................................... 34/137 |
| 3,398,058 | 8/1968 | Campbell .................................. 201/15 |
| 3,481,720 | 12/1969 | Bennett ...................................... 48/89 |
| 3,607,121 | 9/1971 | Watson et al. ............................. 23/279 |
| 3,639,111 | 2/1972 | Brink et al. ................................ 48/111 |
| 3,691,019 | 9/1972 | Brimhall .................................. 202/118 |
| 3,771,263 | 11/1973 | Borggreen et al. ........................ 48/209 |
| 3,787,292 | 1/1974 | Keappler ................................. 202/118 |
| 3,794,565 | 2/1974 | Bielski et al. ............................ 202/100 |
| 4,037,543 | 7/1977 | Angelo ...................................... 110/14 |
| 4,058,205 | 11/1977 | Reed, Jr. .................................... 202/86 |
| 4,061,544 | 12/1977 | van Ackeren et al. .................. 202/141 |
| 4,122,036 | 10/1978 | Lewis ....................................... 252/421 |
| 4,140,478 | 2/1979 | Kawakami et al. ....................... 432/13 |
| 4,235,676 | 11/1980 | Chambers ................................ 202/118 |
| 4,247,367 | 1/1981 | Reilly ....................................... 202/105 |
| 4,259,060 | 3/1981 | Korzeb et al. .............................. 423/3 |
| 4,261,795 | 4/1981 | Reilly ....................................... 202/118 |
| 4,280,879 | 7/1981 | Taciuk ...................................... 202/100 |
| 4,285,773 | 8/1981 | Taciuk ...................................... 202/100 |
| 4,308,103 | 12/1981 | Rotter ....................................... 202/117 |
| 4,344,821 | 8/1982 | Angelo, II ................................. 201/33 |
| 4,374,704 | 2/1983 | Young ...................................... 202/117 |
| 4,439,209 | 3/1984 | Wilwerding et al. ....................... 48/76 |
| 4,477,984 | 10/1984 | Wenger ..................................... 34/128 |

(List continued on next page.)

FOREIGN PATENT DOCUMENTS 0500792   9/1992   European Pat. Off. .

*Primary Examiner*—Bekir L. Yildirim
*Attorney, Agent, or Firm*—Conley, Rose & Tayon, P.C.

[57] ABSTRACT

An apparatus and method for the separation and chemical and physical alteration of organic solid material in which the materials are placed in a sealed rotating drum and exposed to hot products of combustion produced by a flame in the drum. The temperature, oxygen content, material flow rate and dwell time within the drum are controlled so that a substantial portion of the organic molecules is cracked and reformed. Many of these cracked molecules revert to a gas or liquid, and the gas, liquid, and remaining solids from the initial material are separately collected and processed further. The inside of the drum is kept clean by recirculating carriers. The drum wall is cooled by exposure to the ambient temperature and selectively insulating the inside of the drum. The flame is produced with a stoichiometric mixture of oxygen and fuel to produce a temperature to avoid combustion of the solid material. In an alternative, the flame is provided with an excess of oxygen to cause combustion of a selected quantity of the organic material. A method is disclosed for cleaning and disposing of the non-condensable off-gases.

5 Claims, 3 Drawing Sheets

U.S. PATENT DOCUMENTS

| | | | |
|---|---|---|---|
| 4,563,246 | 1/1986 | Reed et al. | 202/100 |
| 4,730,564 | 3/1988 | Abboud | 110/246 |
| 4,872,954 | 10/1989 | Hogan | 202/105 |
| 4,925,389 | 5/1990 | DeCicco et al. | 432/106 |
| 5,078,836 | 1/1992 | Hogan | 201/7 |
| 5,207,176 | 5/1993 | Morhard et al. | 110/246 |
| 5,227,026 | 7/1993 | Hogan | 202/117 |
| 5,364,182 | 11/1994 | Hawkins | 366/25 |
| 5,374,403 | 12/1994 | Chang | 422/168 |
| 5,393,501 | 2/1995 | Clawson et al. | 422/187 |

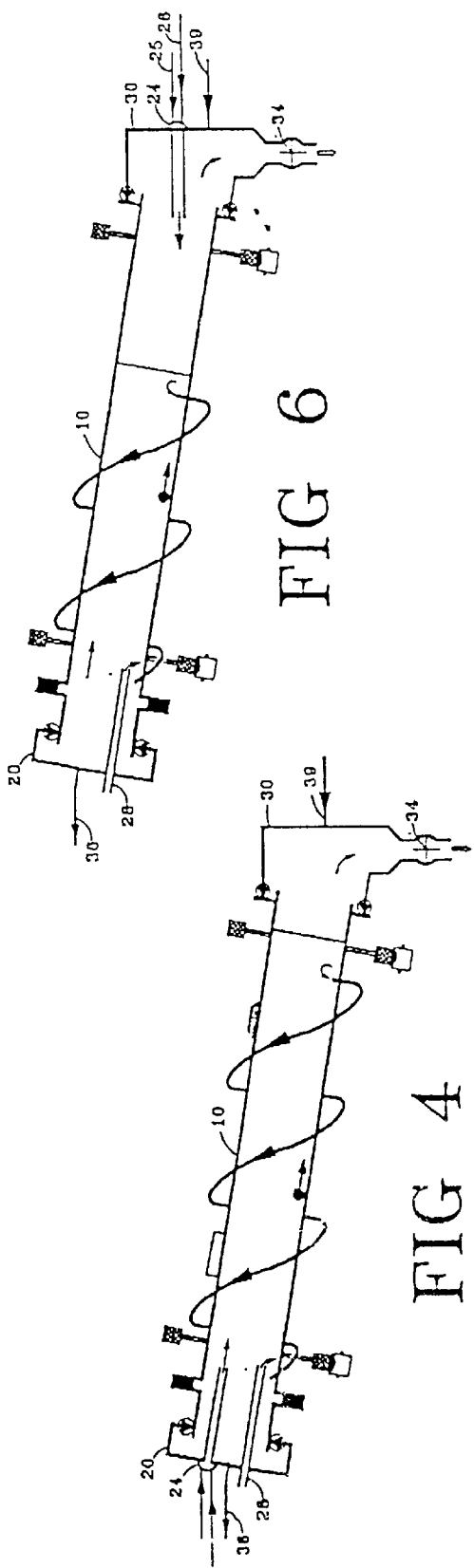
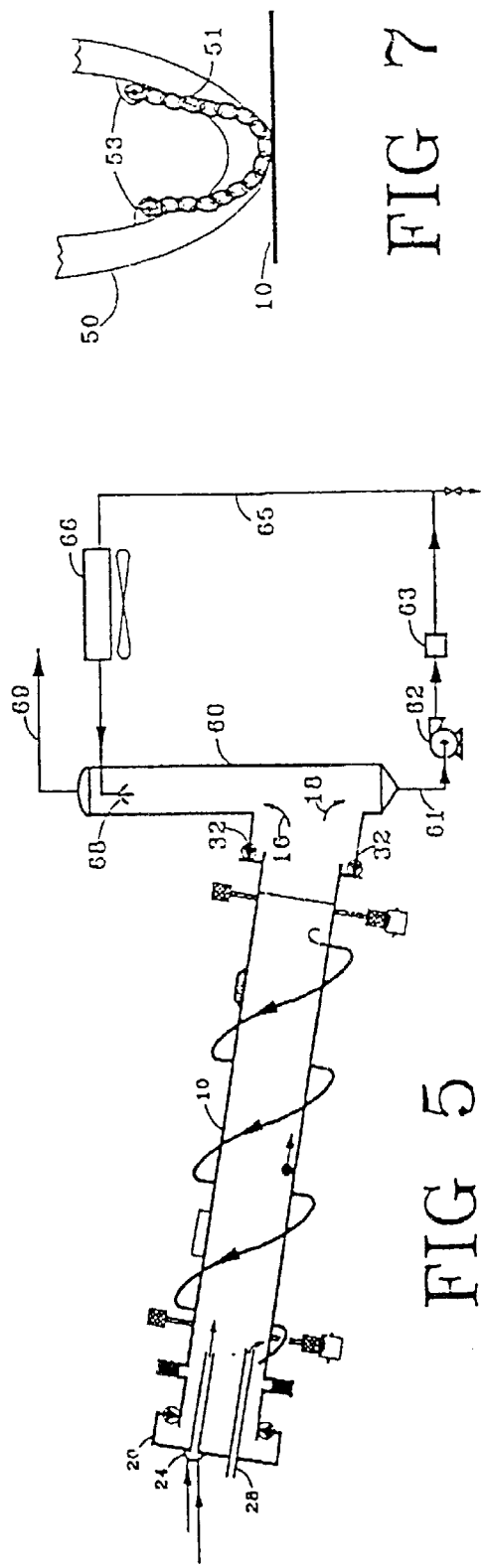
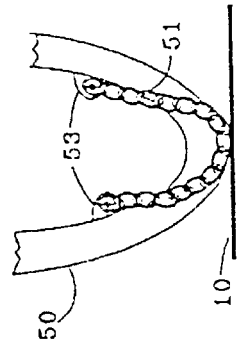
FIG 4
FIG 6
FIG 5
FIG 7

APPARATUS FOR PROCESSING AN ORGANIC SOLID

FIELD OF THE INVENTION

This invention relates to the field of cracking organic molecules and, more particularly, to a method and apparatus for reducing a substantial portion of a solid material containing organic components to a liquid or gas state by cracking the molecules by exposure to heat produced by a flame in a rotating drum. The flame can be produced with a stoichiometric mixture of oxygen and fuel, avoiding combustion of the organic components; alternatively, a selected amount of excess oxygen can be included so that a selected amount of the organic components can be oxidized.

BACKGROUND OF THE INVENTION

In the interest of protecting the environment, waste treatment has become a major industry. Various methods and apparatus have been devised to efficiently convert wastes to a less harmful form or to a form which can be more easily disposed of in a manner to prevent damage to the environment.

Waste materials include a large variety of components, many of which are organic in composition. For example, the processing of petroleum results in quantities of sludge known as "tank bottoms", which typically consist of about 50% water, 30% oil and 20% solids which may include high molecular weight hydrocarbons and inorganic materials, including common dirt. Another waste material produced from petroleum processing is activated carbon which has been rendered inactive by contamination with hydrocarbons. From the nuclear power industry, cooling water for nuclear reactors becomes contaminated with radioactive particles. This water is cleaned by passing it though a bed of ion exchange resin particles, which may comprise polystyrene granules, for example. The disposition of the large quantities of such resins contaminated with radioactive wastes has become a major problem. Another operation which encounters similar problems is the recovery of shale oil, separating usable petroleum products from the inorganic rock and sand. All of these processes involve the separation of an organic material from inorganic materials.

The incineration of organic materials in a rotating drum, or retort, is well known in the art. The inside of these incinerators are sometimes provided with stationary flights, or paddles, attached to the inside of the drum to lift the material being incinerated and to help move the material down the drum. These flights, exposed to the high temperature and often corrosive and abrasive material, have a short life, and the material being incinerated sometimes cokes and clogs the incinerator. The incinerators are also necessarily provided with sufficient excess oxygen to burn substantially all of the material being incinerated.

The use of rotating drums to convey waste materials while using heat to modify such materials either chemically or physically is also well known in the art. Examples of such apparatus may be found, for example, in my U.S. Pat. Nos. 4,872,954, issued Oct. 10, 1989; 5,078,836, issued Jan. 7, 1992; 5,227,026, issued Jul. 13, 1993 and 5,523,060, issued Jun. 4, 1996, the disclosures of which are incorporated herein by reference.

U.S. Pat. No. 5,425,792 discloses a method for gasifying organic materials to produce synthesis gas containing predominately carbon monoxide and hydrogen, with a maximum of about 2% of hydrocarbons having more than two carbon atoms.

SUMMARY OF THE INVENTION

The present invention comprises an apparatus and a method for reducing a solid, or substantially solid, organic material to a more liquid and gaseous state by exposing the material to a flame in a sealed rotating retort while controlling the temperature, oxygen supply, flow rate and dwell time to produce a desired product. The organic material flows or is fed to the inside of the drum through a stationary bulkhead that is attached to the rotating drum with seals to seal the inside of the drum from the outside of the drum. A burner is also attached to that bulkhead or a stationary bulkhead at the opposite end of the drum. Fuel and oxygen are provided to the burner and the burner is arranged to cause its flame to extend a desired distance into the drum. The organic material is exposed to the products of combustion, carbon dioxide and water vapor, and heat from the flame. Depending on the nature of the feed material, the temperature, volume of feed material, dwell time and amount of oxygen supplied, organic materials may be cracked to form predominately normally liquid products, or both liquid and gaseous products, or predominately gaseous products. The vapors and remaining solid material from the initial material are separated in a solids separator on the exit side of the drum. This separator is connected to the drum with seals that seal the inside of the drum and separator from the outside of the drum and separator. The vapors flow from the separator to an oil spray vessel that is maintained at a temperature above the boiling point of water. This oil spray vessel removes solid particles, and hydrocarbon molecules that condense at a lower temperature, from the vapors. The remaining vapor, including water vapor, then flows to a water spray vessel that is sprayed with cold water for condensing the water vapor and removing any remaining solid particles. If the organic material may contain radioactive material, the remaining gases can then flow through an optional chiller for further removal of water vapor and solid particles and an optional filter for final removal of solid particles. Since cracking of organic molecules in the presence of water vapor and carbon dioxide sometimes produces hydrocarbon gases and carbon monoxide, an optional oxidizer can be provided as the final processing of the gas stream from such operations before releasing it to the atmosphere.

The rotating drum can selectively be provided with a freely rotating spiral as described in my U.S. Pat. No. 5,078,836 for moving the feed material and the carriers from the inlet of the drum to the outlet end of the drum, or the drum 10 can be sloped or tapered such that the carriers and organic material being processed flow by gravity from the drum inlet to the drum outlet. A conduit or pipe is wound spirally around the outside of the drum for returning the carriers from the drum outlet back to the drum inlet. A separating structure is provided on the inside of the drum outlet for separating the carriers from any remaining solids and lifting the carriers to the conduit inlet, and the conduit is wound spirally such that the carriers progress back to the drum inlet as the drum rotates.

The apparatus of the present invention can be operated as an incinerator, and it can also be operated exclusively as a retort that reduces the organic material by cracking it with heat in the presence of carbon dioxide and steam and in the absence of oxygen in excess of the amount required to produce the flame to generate sufficient heat for the process. High molecular weight paraffinic, aromatic and heterocyclic hydrocarbons can be reduced to relatively low molecular weight, usually less than nine carbon atom, compounds which are liquid at atmospheric conditions and which are useful as liquid fuels or solvents, such as diesel oil, gasoline and naphtha.

It is, therefore, an object of the present invention to provide an apparatus for cracking an organic material by exposing the material to a flame in a sealed rotating drum so that the drum walls can be cooled by exposure to ambient conditions, preventing degradation of the material of the drum walls while allowing the use of higher temperatures inside the drum.

It is also an object of the present invention to provide an apparatus for cracking an organic material in a sealed container by exposing the material to a flame having no excess oxygen and therefore minimizing the oxidation of the organic material.

It is also an object of the present invention to provide an apparatus for cracking an organic material in a sealed rotating drum having carriers circulating on the inside of the drum, to clean the drum inside and prevent clogging, and means for returning the carriers from the discharge end of the drum to the feed end.

It is also an object of the present invention to provide an apparatus and a process for cleaning the non-condensable gases from a rotating retort.

It is also an object of the present invention to provide a means for providing a low temperature seal on a high temperature rotating retort.

It is also an object of the present invention to provide a means for processing an organic material with high temperature, without incineration, and producing a marketable product.

It is also an object of the present invention to provide a retort that is easier to permit since it does not utilize incineration in the process and a marketable product is produced.

It is also an object of the present invention to provide an apparatus and a process for processing ion exchange and other polymeric and resinous materials and the like contaminated with a radioactive material by converting the organic material to a gas and thereby reducing the quantity of solid radioactive material for further processing and disposal.

Other objects and advantages of the invention will become more apparent upon a consideration of the preferred embodiments described hereinafter.

BRIEF DESCRIPTION OF THE DRAWINGS

For a detailed description of the preferred embodiments of the invention, reference will now be made to the accompanying drawings, wherein:

FIG. 4 is a schematic drawing of another embodiment of the invention in which the gases exit the same end of the drum that the feed enters, rather than the end that the solids exit.

FIG. 5 is a schematic drawing of another embodiment of the invention in which the solids separator has been omitted and the solids and gases flow directly from the drum to a spray tower.

FIG. 6 is a schematic drawing of another embodiment of the invention in which the burner is placed in the outlet end of the drum so that the direction of the flame is opposite the direction of the feed material.

FIG. 7 is a schematic drawing of a section of the freely rotatable spiral inside of the drum.

In the drawings, like items for the various figures have the same numbers and these numbers are numerically tabulated with a brief description for easy reference as follows:

Figure 2:
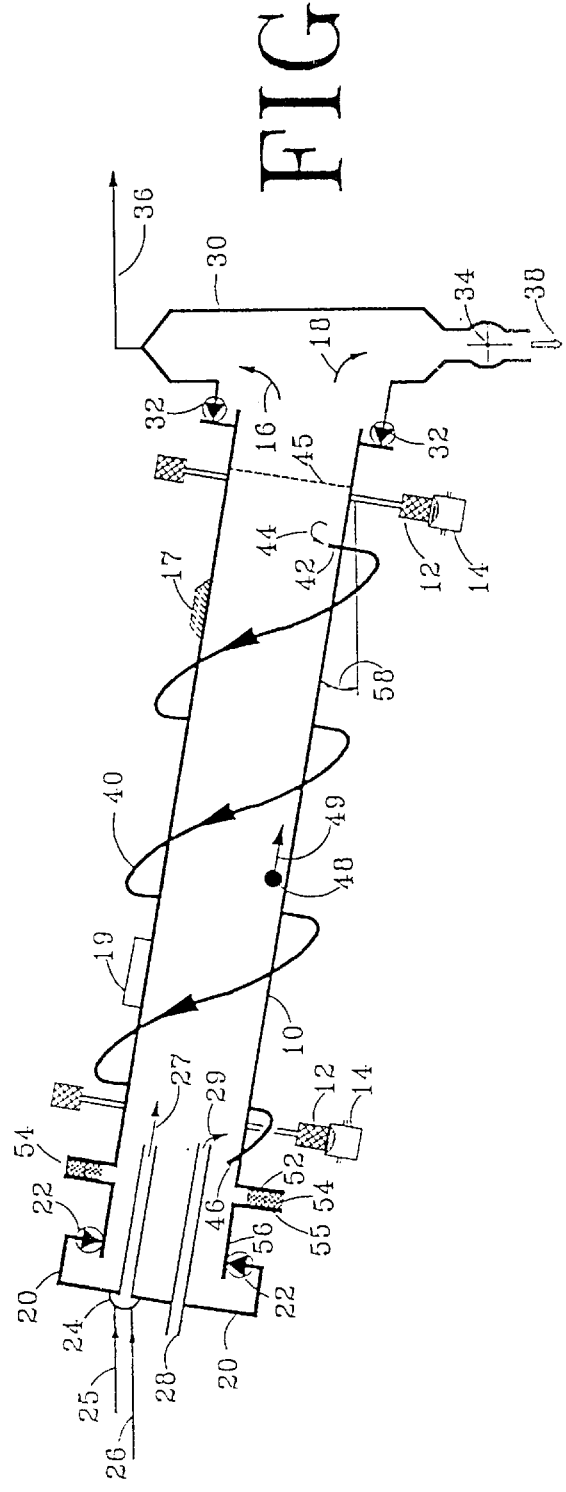
FIG. 2 is a schematic drawing of another embodiment of the invention in which the drum is placed on a slope so that the carriers and other solid materials move longitudinally of the drum by gravity.

| ITEM NO | ITEM DESCRIPTION |
|---|---|
| 10 | Rotatable Drum |
| 12 | Wheel supporting the rotatable drum |
| 14 | Roller for supporting the wheel |
| 16 | Arrow showing the gas in the solids separator |
| 17 | Insulation on drum |
| 19 | Cooling fins on drum |
| 18 | Arrow showing the solids in the solids separator |
| 20 | Fuel and Feed Bulkhead |
| 22 | Fuel and Feed Bulkhead Seal |
| 24 | Burner |
| 25 | Fuel supply line to the Burner |
| 26 | Oxygen supply line to the Burner |
| 27 | Flame from the Burner |
| 28 | Line for feeding the drum with the material to be processed |
| 29 | Organic feed material to be processed |
| 30 | Solids Separator |
| 32 | Seal between Drum and Solids Separator |
| 34 | Vapor Lock Valve |
| 36 | Vapor line from Solids Separator or feed bulkhead |
| 38 | Solids from Solids Separator |
| 39 | Purge gas line |
| 40 | Spiral Conduit attached to drum outside |
| 42 | Spiral Conduit inlet |
| 44 | Lift for placing carriers in Conduit |
| 45 | Solids and Carriers separating screen |
| 46 | Outlet of Carriers Conduit |
| 48 | Carriers |
| 49 | Arrow showing flow of Carriers |
| 50 | Freely rotating Spiral inside of rotating Drum |
| 51 | Section of a chain |
| 52 | Seal Cooling Flange |
| 53 | Point of attachment of chain to spiral |
| 54 | Insulation on Seal Cooling Flange |
| 55 | Corresponding Seal Cooling Flange |
| 56 | Polished surface for Seal |
| 58 | Slope of FIG. 2 drum |
| 60 | Oil spray Vessel |
| 61 | Liquid line from Oil spray Vessel |
| 62 | Oil spray Pump |
| 63 | Oil Filter |
| 64 | Filtered oil return line |
| 65 | Spray oil line to Cooler |
| 66 | Spray oil Cooler |
| 67 | Spray oil Cooler bypass valve |
| 68 | Oil Spray Sprayer |
| 69 | Gas line from Oil Spray Vessel to Water Spray Vessel |
| 70 | Water Spray Vessel |
| 71 | Water line from Water Spray Vessel |
| 72 | Water Spray Pump |
| 73 | Water Filter |
| 74 | Filtered water return line |
| 75 | Spray water line to Water Cooler |
| 76 | Water Cooler |
| 78 | Water Spray Sprayer |
| 79 | Gas line from Water Spray Vessel to Chiller |
| 80 | Chiller |
| 81 | Control valve on oil Spray vessel discharge line |
| 83 | Level Controller on Oil Spray vessel |
| 82 | Final gas Filter |
| 84 | Oxidizer |
| 86 | Clean gas line to atmosphere |

-continued

| ITEM NO | ITEM DESCRIPTION |
|---|---|
| 91 | Control valve on Water Spray vessel discharge line |
| 93 | Water Level controller on Water Spray Vessel |
| 94 | Oil Level Controller on Water Spray Vessel |
| 96 | Oil Discharge Line on Water Spray Vessel |
| 98 | Valve controlling flow through Oil Discharge Line |

DESCRIPTION OF THE PREFERRED EMBODIMENTS

Figure 1:
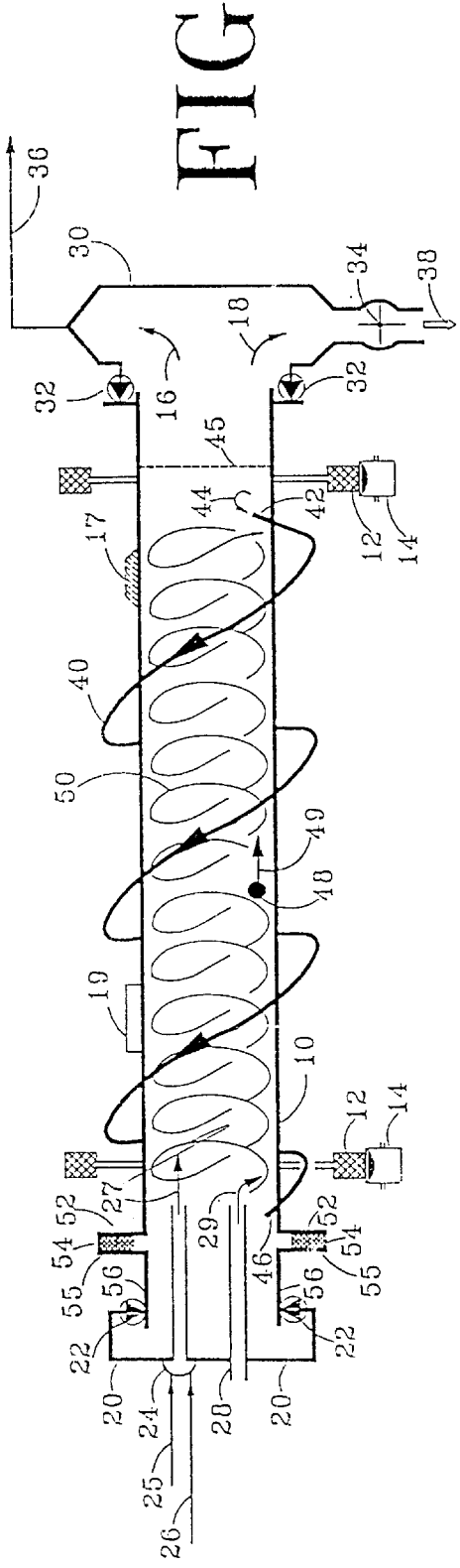
FIG. 1 is a schematic drawing of one embodiment of the invention showing a rotating drum, a feed and burner bulkhead, a solid separator, and a freely rotating spiral for moving carriers and other solid materials longitudinally of the drum.

Referring now to FIG. 1, there is shown a mounted cylindrical rotating drum 10 with its inlet end to the left of the viewer and its outlet end to the right of the viewer. Drum 10 is provided with support rings 12 which roll on roller wheels 14. Mountings for supporting the roller wheels 14 and a power source for rotating the drum are not shown, since many variations of such as are suitable are known by those familiar with the art.

The inlet end of drum 10 is attached to bulkhead 20 by seal 22. Seal 22 is provided to prevent fluid flow between the outside of the drum and the inside of the drum and allows bulkhead 20 to be stationary while drum 10 rotates. Bulkhead 20 is provided with burner 24 which, in turn, is provided with fuel supply line 25 and oxygen supply line 26. Burner 24 is extended into drum 10 as shown so that the flame from burner 24 goes into the drum as shown by arrow 27. Drum 10 is provided with flange 52 which cooperates with a corresponding flange 55 on a polished drum extension 56 to clamp between the flanges an annular insulator 54 to minimize the conduction of heat from the body of drum 10. Bulkhead 20 is also provided with feed line 28 for transferring the organic material to the inside of drum 10 as shown by arrow 29.

Inside of drum 10 is freely rotating spiral 50 whose axis is parallel with the axis of the drum and which is wound in such a direction that when drum 10 rotates, spiral 50 rolls and slides circumferentially around the inside of the drum 10 and moves the carriers 48 and the feed material from the inlet end to the outlet end of drum 10 as shown by arrow 49.

Affixed to the outside of drum 10 is a spirally wound conduit 40 that is wound around and rotates with the drum so that when the drum 10 rotates, carriers 48 that are placed in the inlet end 42 of conduit 40 are moved from the inlet end 42 to the outlet end 46 and therefore are recirculated from the outlet end of drum 10 and back to the inlet end of drum 10. A conveyor, such as scoop 44, which may be of the type shown in my U.S. Pat. No. 5,227,026, separates the carriers 48 from particles of solid material being processed and lifts the carriers and deposits them into the inlet 42 of conduit 40. Screen 45 has a mesh of a size to allow the passage of comminuted solids but to prevent the passage of the carriers, and allows the solids to flow through and out the outlet end of drum 10 but prevents the carriers from flowing out of drum 10. Although such carriers have been found to be particularly efficient in comminuting solid materials and preventing adherence to the wall of the drum, other means known to those skilled in the art may be used for this purpose.

Insulation 17 is optionally affixed to selected portions of the outside of drum 10 to keep selected portions of drum 10 from getting too cool and radiation fins 19 are optionally affixed to other selected portions of the outside of drum 10 to radiate heat from drum 10 and to keep other selected portions of drum 10 from getting too hot. Alternatively, other cooling and heating elements well known to those skilled in the art may be used for these purposes. In one embodiment of the invention, the drum is lined with a refractory material, not shown, in a manner known in the art, with or without an insulating layer to protect the metal of the drum.

Solids separator 30 is connected to drum 10 by seal 32 which seals the inside of drum 10 and solids separator 30 from the outside and allows solids separator 30 to be stationary while drum 10 rotates. The solids flow by gravity from the outlet end of drum 10 to the bottom of solids separator 30 as shown by arrow 18 and gas lock valve 34 allows the solids to flow out as shown by arrow 38 but prevents the gases from flowing out with the solids. The gases flow up in solids separator 30 as shown by arrow 16 and out of solids separator 30 through line 36.

In operating the invention of FIG. 1, drum 10 is supported by support rings 12 and is rotated by rotation means not shown. Fuel and feed bulkhead 20 and solids separator 30 do not rotate with the drum but receive the ends of the drum 10 in seals 22 and 32 to prevent communication between the inside of drum 10, fuel and feed bulkhead 20, and solids separator 30 and the external environment. Feed to be processed is placed in drum 10 inlet at point 29 by feed pipe 28. The feed must be managed so as to control the amount of oxygen admitted with the feed. For example, the material may be fed into the drum by means of an auger or a hydraulic ram. A fuel and oxygen mixture is injected into the inlet of drum 10 at point 27 by burner 24. Combustion of the fuel provides the heat required for the treatment of organic components of the feed material. The feed is preferably pushed longitudinally of the drum by freely rotatable spiral 50 that pushes the feed from the inlet to the outlet of drum 10. Other known means for moving solid materials may also be used. Such means include, for example, sloping the drum downwardly toward the outlet end, or using the method described in U.S. Pat. No. 5,425,792.

In one embodiment of the invention, carriers are placed in the inlet of drum 10 and are pushed down the drum with the feed by spiral 50. These carriers, which are usually round or hexagon shaped balls of steel, tend to mull the feed and scrape and clean the inside wall of drum 10 as they tumble and roll down drum 10 with the feed. These carriers 48 are separated from the remaining solids from the processed feed by scoop 44 at the outlet of drum 10. As the drum 10 rotates, this screened scoop 44 lifts the carriers 48, without the remaining solids, and places them in conduit 40 at its inlet 42. This conduit 40 is wound spirally in a direction such that as the drum rotates the carriers flow back through the conduit to the inlet of drum 10 at point 46. Accordingly, carriers 48 are pushed with the feed from the inlet of drum 10 to the outlet of drum 10, by spiral 50, to mull the feed and clean the inside of drum 10, and the carriers 48 are separated from the remaining feed solids, at the outlet of drum 10, by screened scoop 44 and placed in the inlet 42 of conduit 40 which returns the carriers 48 to the inlet of drum 10 at point 46. Screen 45 allows the remaining solids and gases from the processed feed to flow out the outlet end of drum 10 but prevents the carriers 48 from leaving the drum and, accordingly, the carriers 48 remain in the drum 10 and are continually recirculated in the drum 10.

The remaining solids from the processed feed flow out the outlet of drum 10 by gravity into solids separator 30 as shown by arrow 18. These solids flow out solids separator 30 through gas lock valve 34 which allows solids to pass but prevents vapors and gaseous combustion products from passing. These solids then flow to storage, as indicated by arrow 38, for further handling. The vapors from the processed feed are separated by gravity from the solids in solids separator 30 and flow up and out of solids separator 30, as indicated by arrow 16, and through line 36 for further processing.

Burner 24 is supplied fuel by line 25 and oxygen by line 26. The oxygen in line 26 can selectively be pure oxygen or air. The ratio of fuel to oxygen is controlled by an instrument which is not shown since it is known by those familiar with the art. This instrument can be selectively set to make a chemically correct mixture of fuel and oxygen, or a stoichiometric mixture, such that there is substantially no excess oxygen in the flame. With no excess oxygen in the flame, the products of combustion are very hot carbon dioxide and water vapor, which serves to heat the feed material. Although some of the organic feed will crack at a temperature below around 1150° F., additional compounds will crack at a temperature above approximately 1150° F., producing carbon monoxide and hydrogen when the carbon dioxide and water vapor produced by the flame contacts the organic feed material. Accordingly, to increase cracking, the organic feed should be taken to a temperature above approximately 1150° F., but to minimize fusion on some feed materials, usually below approximately 1500° F. Sometimes additional water vapor or carbon dioxide must be added to the flame area to provide additional oxygen and hydrogen gas and crack additional larger hydrocarbon molecules.

Organic material can be processed in the apparatus of the present invention using many variations of operating modes including the following:

OPERATING MODE #1—Using a stoichiometric mixture of fuel and oxygen flame and taking the feed material to a temperature high enough to condense the selected hydrocarbon molecules but below about 1150° F. to minimize the production of syngas.

OPERATING MODE #2—Using a stoichiometric mixture of fuel and oxygen flame and taking the feed material to temperatures of above about 1150° F. to produce a syngas from the products of combustion from the flame but below a temperature of about 1470° F. to minimize incipient fusion of the charge.

OPERATING MODE #3—The same as Mode #2 except that additional water vapor and/or carbon dioxide is added in the flame area to add additional oxygen for the production of syngas.

OPERATING MODE #4—The same as Mode #2 except a selected amount of excess oxygen is added to the flame area to burn a selected amount of feed material and produce additional heat to reduce the fuel requirement of the burner.

OPERATING MODE #5—The same as Mode #2 except sufficient excess oxygen is added to the flame area to burn substantially all of the organic material in the feed.

Accordingly, a feed that is solid or contains a substantial proportion of solids under ambient conditions, comprising long chain paraffinic, aromatic or complex heterocyclic hydrocarbon molecules, can be processed in drum 10 with a stoichiometric flame, producing products which are liquid and/or gas under ambient conditions, such as naphtha, diesel, fuel oil, and syngas. The temperature, oxygen level and feed rate must be carefully controlled to avoid combustion of the feed material or its products and to limit production of carbon monoxide, hydrogen and low molecular weight, normally gaseous hydrocarbons. To the extent such gaseous products are produced, they can be later separated from the liquid products and fed back to the burner for use as fuel. Alternatively, a controlled amount of excess oxygen may be provided to oxidize some of the organic material in the drum, generating heat to reduce the fuel required.

Such stoichiometric, or substantially stoichiometric, conditions are suitable for processing materials which are at least partially organic and which can be cracked in a substantially oxygen-free atmosphere at selected temperatures in the range of above about 800° F. and usually under about 1500° F. Such materials include refinery tank bottoms, deactivated carbon or shale oil to produce useful materials.

Some very high molecular weight organic molecules, such as ion exchange resins, polystyrene and other resinous and polymerized materials, do not readily crack at high temperature. Such materials are used, for example, to remove radioactive material from cooling water for nuclear reactors, and become contaminated with such materials, so that it is necessary to safely dispose of the contaminated material. Disposition of such materials is a major problem because of the high volume of the organic material. In one embodiment of this invention, the volume of polystyrene and other polymers and resinous materials is reduced substantially by reducing the solid material to a gas by combustion. This combustion must be under controlled conditions which produce a product consisting essentially of carbon dioxide, water and a very small amount of ash. The apparatus of the present invention can give such controlled conditions by providing sufficient excess oxygen for complete combustion and controlling the rate at which the feed material is fed to the drum 10. The resulting carbon dioxide and water can be processed for release to the atmosphere, and a volume of ash containing the radioactive solid material, reduced substantially from the original volume, can economically be encased in a lead, glass, zinc, or other material that allows the radioactive material to be stored without leaching to the local environment.

Since the outside of the outlet end of drum 10 is exposed directly to the atmosphere, sufficient heat is radiated from the outlet end of drum 10 wall such that seal 32 operates at a relatively cool temperature, usually less than 600° F'. Under some conditions, however, some portions of drum 10 gets too cold and insulation 17 must be affixed to selected portions to the outside of drum 10. Also, other portions on the inlet end of drum 10 can get too hot and fins 19 must be affixed to other selected portions on drum 10 to radiate more heat from drum 10. Alternatively, the temperature of the solid material in the drum may be more uniformly controlled, and the seals protected from high temperature, by lining the drum with a refractory material, surrounded by an insulating material, an a manner well known in the art.

It has been found that in processing some waste material, such as in the regeneration of activated carbon, the carriers sometimes mull the waste material excessively and grind it into too fine a material. In such instances, it may be desirable to operate the plant with only the freely rotatable spiral and to omit the carriers. It has also been found that when operating the apparatus without the carriers, some drum cleaning may still be required. FIG. 7 of the drawings shows a section of spiral 50 inside of drum 10 with chain 51 selectively attached at points 53 on the spiral such that in rotation the chain moves, sags, and scrapes the spiral and sections of the drum inside to keep the spiral and drum clean but not excessively mull the material being processed.

Reference is now made to FIG. 2 which shows another embodiment of the present invention. In this embodiment the freely rotatable spiral 50 in drum 10 of FIG. 1 has been omitted in drum 10 of FIG. 2, and the drum 10 of FIG. 2 is maintained on a slope as indicated by angle 58, whereas the drum 10 of FIG. 1 is not necessarily on a slope. All the other items of drum 10 of FIG. 2 are the same as FIG. 1 and have the same identification numbers and same function.

Since the spiral 50 of FIG. 1 is not included with the apparatus of FIG. 2, slope 58 allows carriers 48 to flow by gravity down the drum with the feed as indicated by arrow 49. The slope of spirally wound conduit 40 is such that carriers 48 still flow uphill to point 46 on drum 10. The apparatus of FIG. 2 can be operated at a higher temperature than the apparatus of FIG. 1 since the spiral 50, which is exposed directly to the flame in FIG. 1, has been omitted in the apparatus of FIG. 2.

Figure 3:
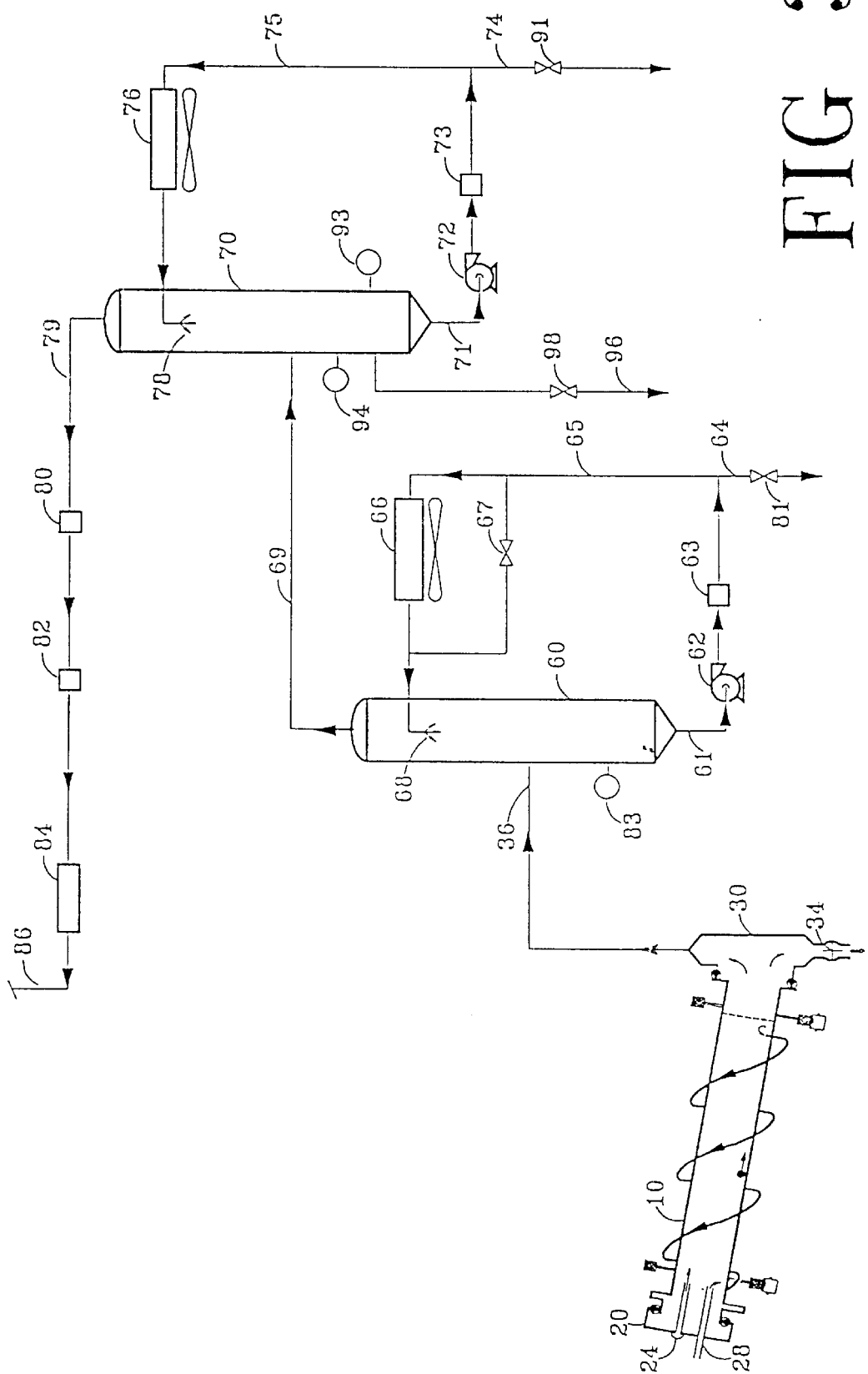
FIG. 3 schematically shows a preferred method for cleaning the uncondensed gases that flow from the drum.

Reference is now made to FIG. 3 which schematically shows the equipment and one process for processing the gases from the drum. The gases flow from solids separator 30 through pipe 36 as previously described. This gas flows to oil spray vessel 60 where it is sprayed with an oil from spray nozzle 68. This spray oil removes small carryover solids from the gas and also cools the gas to a selected temperature. The temperature is maintained at a temperature above the boiling point of water so that water is not condensed. If normally liquid hydrocarbons are present in vapor form, some of these may be condensed at this point. It has been found that if water is allowed to condense in vessel 60, a very tight troublesome emulsion sometimes forms. The spray oil is collected in the bottom of vessel 60 and flows through line 61 to pump 62 which pumps the oil through filter 63, line 65, cooler 66, and back to spray nozzle 68. Since cooler 66 can sometime cool the oil excessively, bypass valve 67 is provided to selectively bypass cooler 66. Since oil is condensed from the gas stream entering vessel 60, excess oil is removed through line 64 by valve 81 as controlled by level controller 83.

Gases, having substantially all of the solids and heavy oil removed, flows from vessel 60 to water spray vessel 70 through pipe 69. This gas is additionally cooled by cold water sprayed through nozzle 78 in vessel 70. This water removes additional small particles that may have been carried over with the gas. The water is collected in the bottom of vessel 70 and flows through line 71 to pump 72 which pumps the water through filter 73, line 75, cooler 76 and back to spray nozzle 78. Since additional water is condensed from the gas stream brought into vessel 70 through line 69, excess water is removed through line 74 by valve 91 as controlled by interface level controller 93. Light oil that condenses in vessel 70 is skimmed off by line 96 as controlled by valve 98 which is also controlled by level controller 94.

The gases then flow from vessel 70 to optional chiller 80 through line 79. Although the gases from vessel 70 are substantially free from water and solids, some water vapor can still be carried over with the gas, and accordingly, some very small solid particles can still be carried over with such water vapor. Therefore, chiller 80 may be optionally provided to chill the gas to dry and remove remaining water vapor from certain gas streams, such as those from radioactive feed material.

Optional filter 82 can be optionally provided to give a final polish to the gas from chiller 80. This final polishing filter may be desirable when processing a radioactive feed material.

Optional oxidizer 84 can be optionally provided to oxidize syn gas, such as carbon monoxide, or hydrogen, if such is present in the gases from the material being processed before flowing the gas to atmosphere through line 86.

Reference is now made to FIG. 4 which shows another embodiment of the present invention. In this embodiment the gas line 36 exits bulkhead 20 instead of solids separator 30, and new purge gas line 39 has been added to solids separator 30. In some applications of the invention it may be desirable to remove the gases from the hot end of the drum rather than the cold end with the solids. In some applications it may also be desirable to purge the drum with nitrogen or other inert gas. Therefore, line 39 allows the solids separator and the drum to be purged from the solids exit end to the feed inlet end of drum 10 and gas line 36 on bulkhead 20 allows the gases from the feed and the purge gas to exit the hot end of drum 10. This prevents gases from condensing on the solids in solids separator 30.

Reference is now made to FIG. 5 which shows another embodiment of the present invention. In this embodiment, solids separator 30 has been omitted and the exit end of drum 10 has been connected directly to oil spray vessel 60 by seal 32. Accordingly, seal 32 allows drum 10 to rotate while spray vessel 60 is stationary, yet, the space within spray vessel 60 and drum 10 is not in communication with the outside atmosphere. Some feeds can be processed that will convert the majority of the feed to a liquid or gas. The apparatus of FIG. 5 can be used when processing such feed and the small amount of carry over solids can still be removed by spray vessel 60.

The embodiment of FIG. 6 is the same as that of FIG. 4 except that the burner 24 and fuel and oxygen lines 25 and 26 are mounted in the solids separator 30 at the outlet end of the drum so as to direct the flame counter-currently to the flow of feed material in the drum.

Many modifications of the embodiments described and shown may become apparent to those skilled in the art. For example, although it is preferred to spray the gas with an oil spray vessel before cooling the gas, the oil spray vessel can be omitted and the gas can flow directly to a water spray vessel. Accordingly, the invention is not limited to the specific embodiments disclosed, but extends to all variations within the scope of the appended claims.

What is claimed is:

1. An apparatus for thermally treating an organic material comprising:

a rotatable drum having an inlet end and an outlet end, a stationary cover on each end of the drum, a seal on each of said inlet end and said outlet end of the drum in sealing engagement with the respective covers for sealing the inside of said drum from the outside of said drum, a burner attached to one of said covers for injecting a fuel and oxygen mixture into the drum, a conduit extending through said inlet cover for feeding organic material into a selected area of said drum inlet, a plurality of carriers within the drum, a helical conduit wound around the outside of the drum to rotate with said drum, said helical conduit having an inlet end connected near the drum outlet for receiving carriers from said drum outlet and an outlet end connected near the drum inlet for conveying said carriers to said drum inlet end, said helical conduit being arranged such that when said conduit rotates with said drum, said carriers are conveyed through said conduit from said conduit inlet to said conduit outlet, means for causing said organic material with said carriers to move from said drum inlet toward said drum outlet so that the rolling, tumbling, and scraping of said carriers, moving with said organic material, helps mull said organic material and cleans the inside wall of said drum, a separator located near the inlet end of the helical conduit positioned to separating said carriers from any remaining solid portions of said organic material and placing said carriers in said conduit inlet, an opening in the drum outlet end cover for passing solids and gases from the drum outlet end, and conduits in communication with the opening to convey solids and gases from the outlet end of the drum.

2. The apparatus described by claim 1 where said moving means is a freely rotatable spiral that rotates with said drum.

3. The apparatus described by claim 1 where said gas conduit includes a section for spraying said gas with an oil spray having a temperature greater than the boiling point of water, for wetting and removing solid particles carried over with said gas, and means for removing said wetted solid particles and said oil from said section.

4. The apparatus described by claim 1 where said moving means is a downward slope from said drum inlet down to said drum outlet which allows said organic material and said pieces to flow from the drum inlet to the drum outlet by gravity.

5. An apparatus for reducing the quantity of a solid organic material contaminated with a radioactive material comprising:

a rotatable drum having a sealed inlet end and a sealed outlet end, a driver connected to said drum for rotating it about its axis, means for passing solid organic material into the inlet end of the drum, a plurality of carriers within the drum, moving means associated with said drum to cause the solid organic material and the carriers to move from the inlet end toward the outlet end of the drum, a burner within said drum provided with sufficient fuel and oxygen to cause substantially complete combustion of the organic material, producing a gas consisting essentially of carbon dioxide, water vapor and vaporized radioactive material, and a solid ash containing unvaporized radioactive material, a conduit outside of said drum providing communication between the ends of the drum for recirculating said carriers to the inlet end of the drum upon rotation of the drum, means for condensing and solidifying said vaporized radioactive material, and means for separating said remaining gas substantially free of vaporized radioactive material from remaining ash containing radioactive material.

* * * * *